(12) United States Patent
Kreft et al.

(10) Patent No.: US 11,894,666 B2
(45) Date of Patent: Feb. 6, 2024

(54) VEHICULAR CONDUIT RETENTION ASSEMBLY

(71) Applicant: Cooper Standard Automotive, Inc., Northville, MI (US)

(72) Inventors: Dennis G. Kreft, Davisburg, MI (US); Alex Grant, Highland, MI (US)

(73) Assignee: Cooper Standard Automotive, Inc., Northville, MI (US)

( * ) Notice: Subject to any disclaimer, the term of this patent is extended or adjusted under 35 U.S.C. 154(b) by 432 days.

(21) Appl. No.: 17/126,401

(22) Filed: Dec. 18, 2020

(65) Prior Publication Data

US 2022/0200257 A1   Jun. 23, 2022

(51) Int. Cl.
*H02G 3/32* (2006.01)
*F01P 11/04* (2006.01)
*F02M 35/10* (2006.01)
*F16L 3/12* (2006.01)

(52) U.S. Cl.
CPC ............... *H02G 3/32* (2013.01); *F01P 11/04* (2013.01); *F02M 35/10137* (2013.01); *F16L 3/12* (2013.01)

(58) Field of Classification Search
CPC ..... H02G 3/32; F01P 11/04; F02M 35/10137; F16L 3/12; F16L 3/13; B60R 16/0215
See application file for complete search history.

(56) References Cited

U.S. PATENT DOCUMENTS

| | | | |
|---|---|---|---|
| 4,927,103 A | 5/1990 | Nicholson | |
| 6,830,075 B1 | 12/2004 | McKinney et al. | |
| 8,245,733 B2 | 8/2012 | Renaud | |
| 2014/0151514 A1* | 6/2014 | Asai | F16L 3/08 248/74.1 |

* cited by examiner

*Primary Examiner* — Jacob M Amick
*Assistant Examiner* — Charles J Brauch
(74) *Attorney, Agent, or Firm* — Paschall & Associates, LLC; James C. Paschall

(57) ABSTRACT

This disclosure relates to a conduit or pipe retention assembly for a vehicle. A vehicle fluid conduit outer perimeter surface includes one or more protrusions mechanically printed on the outer perimeter surface of the conduit or pipe. A mounting clip is mounted to the fluid conduit adjacent to one of the protrusions. The mounting clip includes retention devices for attaching the conduit to a vehicular structure.

18 Claims, 3 Drawing Sheets

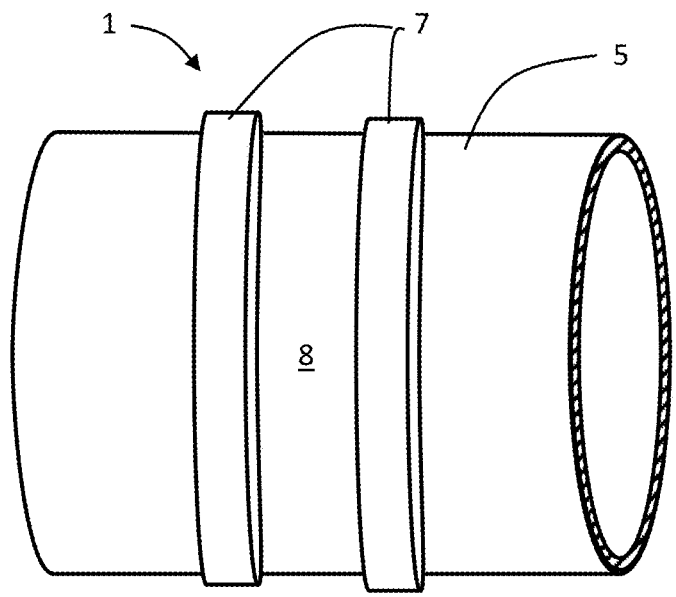
FIG.4
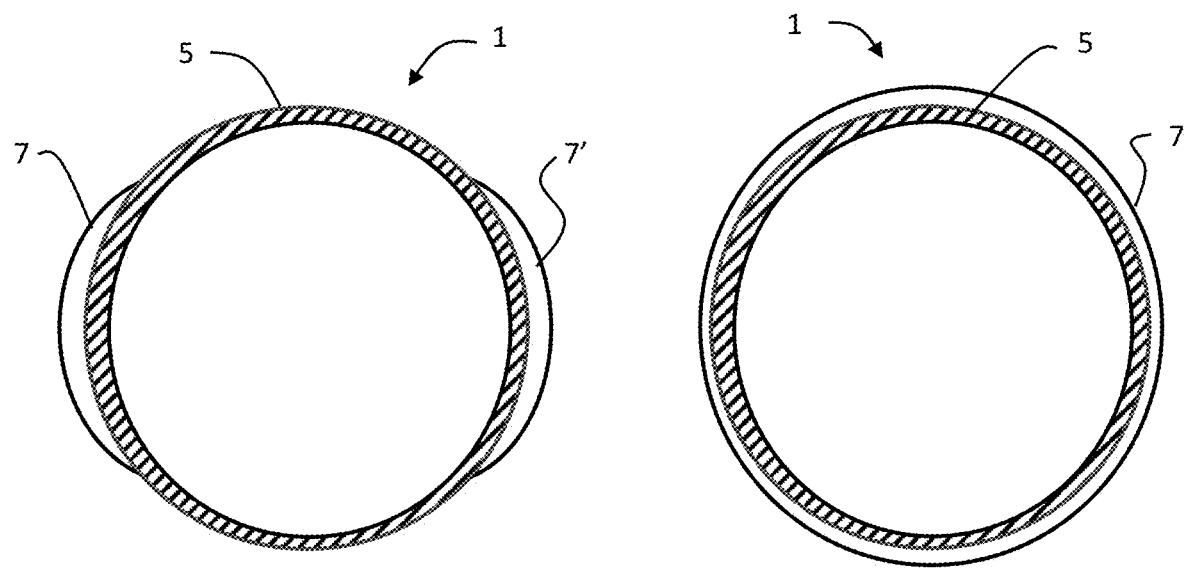
FIG. 3
FIG. 5

VEHICULAR CONDUIT RETENTION ASSEMBLY

TECHNICAL FIELD

This disclosure is generally directed to automotive fluid conduits. More specifically, it relates to a vehicle fluid conduit having printed retention features for locating fasteners such as clips to the conduit.

BACKGROUND

In various automotive applications fluid conduits in the form of flexible pipe, such as a hose, or rigid tubes are used to convey a fluid, such as for example, liquid or air between the various components and assemblies of the vehicle. The fluid conduits are required to be beat in order to route conduits around various structural or frame parts of the vehicle. In addition, one or more conduits are routed together in a conduit assembly between the various vehicular systems. A retention assembly is used to fix the conduit assembly to a vehicle structure. The retention assembly typically using a bracket portion is adapted to be fixed to a support and a clamp or clip portion applied and fixed to the conduit.

Due to the complex nature of the routing on a vehicle structure, it is desirable to have complex assemblies of two or more conduits manufactured and bundled together with their support clamps or clips. In this manner a proper spacing between the conduits as well as the proper locations for attachment of the conduit assembly to the vehicle structure can be maintained. The bundled conduit assemblies are then transported to an installation location and installed on the vehicle. For proper routing and assembly, the support clamps must be accurately located oriented and retained on the conduits in order to mate with associated brackets on a vehicle support. Often the support brackets are displaced by the transportation and handling of the conduit assembly from the point of manufacture and assembly to the point of installation.

It would be desirable to have the fluid conduits of the assembly include retention features that could be fitted onto a conduit in order to properly re-locate the support brackets if they become displaced.

SUMMARY

A first embodiment of the disclosure relates to an automotive vehicular conduit retention assembly. The assembly comprising a fluid conduit having an outer perimeter surface configured with the addition of one or more protrusions mechanically printed on the outer perimeter surface of the conduit. A mounting clip is mounted to the fluid conduit adjacent to one of the protrusions. The mounting clip including retention devices for attaching the conduit to a vehicular structure.

In a second embodiment, a method is disclosed for retaining a conduit to a vehicle. The method comprises mechanically printing one or more protrusions to an outer perimeter surface of a fluid conduit. The method further includes mounting a clip to the conduit adjacent to one of the protrusions and attaching the clip to a structure on the vehicle.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which:

FIG. 3 is a sectional view of the conduit of FIG. 1 in accordance to an embodiment of the present invention;

FIG. 4 is a side elevational view illustrating a conduit having printed retention features that form a continues structure that transversely encircles the entire diameter of the conduit in accordance to an embodiment of the present invention;

FIG. 5 is a sectional view of the conduit of FIG. 4 in accordance to an embodiment of the present invention;

DETAILED DESCRIPTION

Figure 1:
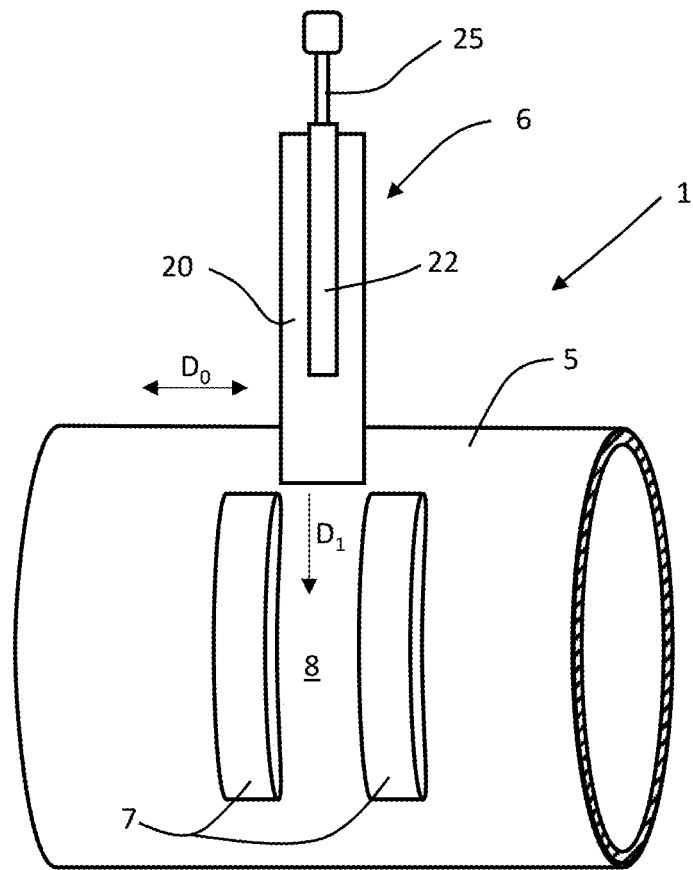
FIG. 1 is a side elevational view illustrating an assembly of a conduit having printed retention features for locating fasteners and a mounting clip, the mounting clip located before assembly on the conduit in accordance to an embodiment of the present disclosure.

The figures, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

Automotive fluid conduits and pipes are commonly made by blow molding or extruding a resin. These conduits may require additional brackets to position or maintain the conduit/pipe under the hood, e.g. to avoid contact of the conduit/pipe with other components, or to hold cables, drains and other lightweight components surrounding the conduit/pipe. Most brackets are injection molded components that are welded to the conduit. The preferred bonding techniques to join the bracket to the conduit are generally welding or occasionally over-molding. Both techniques require either welding equipment and fixtures or a robot to dispose an insert inside the molding cavity between molding sequences. It would be desirable to have a bracket or clip that could be fitted onto a conduit/pipe without the need for welding.

Within the meaning of this application, by the term "conduit or pipe" is meant a semi-rigid conduit, or a flexible elastomeric pipe, as well as conduit or pipe couplings and parts thereof. The conduit/pipe usually takes the form of an elongated, cylindrical hollow body. At one or both of its ends, the conduit/pipe optionally has a conduit coupling or a part of a conduit coupling, a so-called fitting, by means of which the conduit/pipe can be connected to e.g. another conduit/pipe or other conduit units, such as a fixed pipe system or other parts of a pipe assembly.

In a preferred embodiment of the present disclosure, the wall of the pipe or conduit comprises thermoplastic material.

Purely by way of example and non-imitatively, polyamides (PA) or Polyolefins such as polyethylene(PE) or polypropylene or their co-polymers or polyvinylchloride (PVC) or thermoplastic vulcanizates (TPV), such as Santoprene. Such thermoplastic conduits can for example be produced in such a way that the thermoplastic material or material layers are extruded directly into the form of the desired conduit. Alternately, the thermoplastic material can, e.g. by means of extrusion, be transformed into the form of a material web, such as e.g. an extruded profiled rim or a film web, which is then wound helically and in which longitudinal edge sections of adjacent spiral windings, or the opposite edge areas of the material web, are connected to each other overlapping. Furthermore, it is also possible that the pipe or conduit wall comprises several plies or layers of the thermoplastic material which are arranged one on top of another e.g. in the form of several film plies ("sandwich construction").

The preferred embodiment involves the printing or deposition of physical features on the pipe or conduits outer surface to act as physical locators or mechanical stops to aid in the more robust location and retention of clips or fasteners. An embodiment of the present invention uses the printing or deposition of thermoplastic inks or pastes on the conduit/pipe to form locating structures on the exterior wall of the conduit/pipe. The thermoplastic material is deposited on the conduit/pipe via a printing process or via the combination of different printing processes. For example, the printed material may be deposited on the conduit/pipe by means of a flexographic printing process, by means of a gravure printing process, by means of a screen-printing process and/or by means of a digital printing process. Thus, various printing methods can be used to utilize the respective properties to print various features or structures directly on the exterior wall of the conduit/pipe using suitable rigid inks or pastes such as polyamides and polyesters, including polyamides referred to in the art as polyamide 6, polyamide 66, polyamide 6/61, polyamide 6.12, polyamide 10.10

Alternately, the conduit/pipe printed features can also be made in flexible resins such as thermoplastic copolyetheresters, engineering thermoplastic vulcanizates (ETPV), which are combinations of a thermoplastic matrix and an elastomer phase, for example a mixture of a thermoplastic component and an ethylene acrylic rubber thermoplastic vulcanizate.

The printing methods and materials just described can be used, in the direct printing of a desired structure on the conduit/pipe. Alternately, in a preparatory step, an adhesion promotion layer can be applied first to the exterior wall of the pipe or conduit before printing the desired structures. This would be desirable in situations wherein the exterior wall of the conduit is composed of a material that would be difficult to print on, such as, rubber or other rubber infused materials. Additionally, in still another preparatory step, the desired structures may be made by laser engraving, in the pipe wall and then filling and building-up the structures.

FIG. 1 and FIG. 3, illustrate an embodiment of a conduit/pipe 1. Conduit/pipe 1 includes a pair of side-by-side arcuate ribs 7 printed on a conduit/pipe surface 5 on the same side of a cylindrical part of the conduit. A second pair of arcuate ribs 7' can be printed on an opposite side of the conduit/pipe 1. Each rib of the pair of arcuate ribs 7 is parallel to each other. The arcuate ribs 7 are aligned with one another at their ends when they do not encircle the conduit/pipe. This means that, when ribs 7 do not encircle conduit/pipe 1, there is an uninterrupted cylindrical surface 11 on opposite sides of the conduit. A recess 8 is created on the surface 5 between the pair of arcuate ribs 7.

Figure 2:
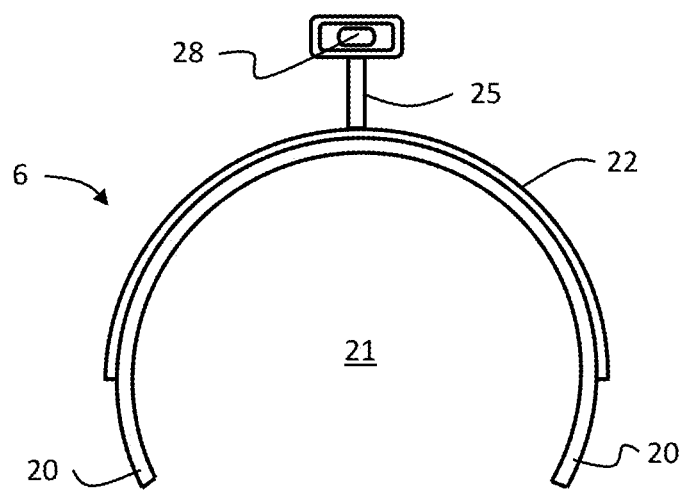
FIG. 2 is a front elevational view illustrating a mounting clip that may be used with the conduit retention features in accordance to an embodiment of the present disclosure.

A mounting member, for example a mounting clip can be fitted onto the conduit/pipe 1. With reference to FIG. 2, an example of a mounting clip used with the embodiment is illustrated. Clip 6 is made of a generally C-shaped open ring with facing curved arms 20, comprising an opening 21 between arms 20. The curved arms include a reinforcing rib 22 partially extending along each arm 20. Generally, the central part of C-shaped clip 6 may include one or more outwardly-extending attachment members such as attachment member 25 that includes retention devices such as hole 28 for securing the clip 6 to a support on a vehicle frame using a fastener, such as for example, threaded screws or pins. Clip 6 when installed on the pipe or conduit 1 allows member 25 to form a bracket for supporting the pipe 1 to the vehicle. By virtue of the C-shaped profile on the facing arms 20, the clip is easily bent and has improved torsional resistance, making it very easy to fit and remove the clip from the pipe or conduit. Moreover, the profile, by its cooperation with complementary pairs of arcuate ribs 7 on the pipe, provides a firm fit on the conduit/pipe. Alternately, the clip 6 can be comprised of a closed ring (not shown) encircling the pipe or conduit within recess 8 of ribs 7. The closed ring would preferably also include an attachment member for securing the ring to a support on the vehicle.

The clip 6 is installed on the conduit/pipe 1 by snapping the clip 6 onto surface 5 within recess 8 of the pipe. The clip 6 is fully installed on the pipe by applying a force in direction Di until the arms 20 completely embrace opposite surfaces 5 of the pipe or conduit. With an arm 20 installed in recess 8 of ribs 7 the clip 6 is prevented from moving from the installed location along direction Do of the conduit. It will be appreciated by those skilled in the art that the other arm 20 of the clip 6 can be similarly located within a comparable recess formed by ribs 7' on an opposite side of conduit.

Referring now to FIG. 4 and FIG. 5, in another illustrated embodiment, a flexible or elastomeric ink can be deposited on the exterior surface 5 of the pipe or conduit/pipe 1 to form a pair of side-by side arcuate ribs 7. Ribs 7 form a continues structure that transversely encircles the entire diameter of the pipe. Each rib 7 of the pair of ribs 7 is parallel to each other creating a recess 8 between the pair ribs 7. As was explained earlier in the description of FIG. 1, recess 8 is adapted to accept and retain therein a clip 6 which is installed in the same manner explained above in FIG. 1.

Figure 6:
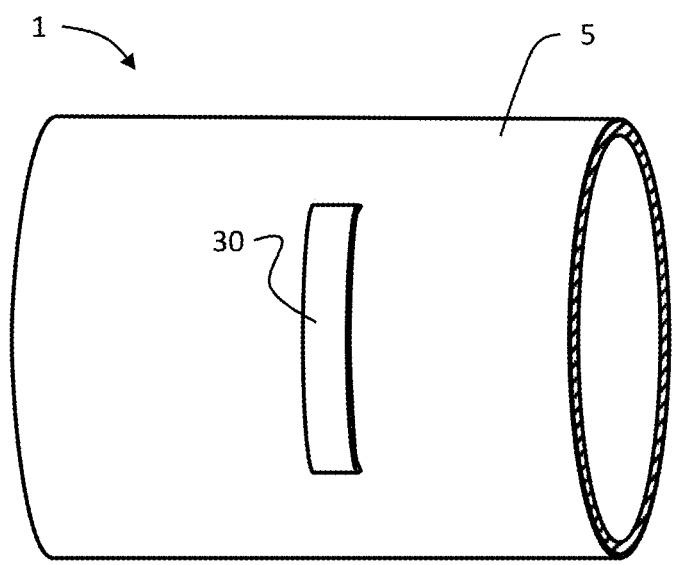
FIG. 6 is a side elevational view illustrating a conduit having a pad of a flexible material printed on the conduit in accordance to another embodiment of the present invention.

Referring now to FIG. 6, a further embodiment is illustrated that has a pad of flexible or elastomeric ink printed on the surface 5 of the conduit/pipe 1. The resilient pad 30 is deposited on surface 5 on one side of conduit/pipe 1. A second resilient pad 30 (not shown) may also be printed on an opposite side of the pipe. Pad 30 is adapted to accept an arm 20 of clip 6 directly on the pad. In the case where a second pad is printed on an opposite side of the pipe, both arms 20 of the clip 6 rest on top of pads 20. Pad 20 provides a friction fit to the curved arm of clip 6, which retains clip 6 in place during handling. Additionally, the elastomeric nature of the resilient pad 20 is capable of isolating transmitted vibrations between the conduit/pipe 1 and clip 6. Alternately or additionally, an abrasive material may be used to form pad 30 to enhance the friction fit between the clip 6 and pipe.

Figure 7:
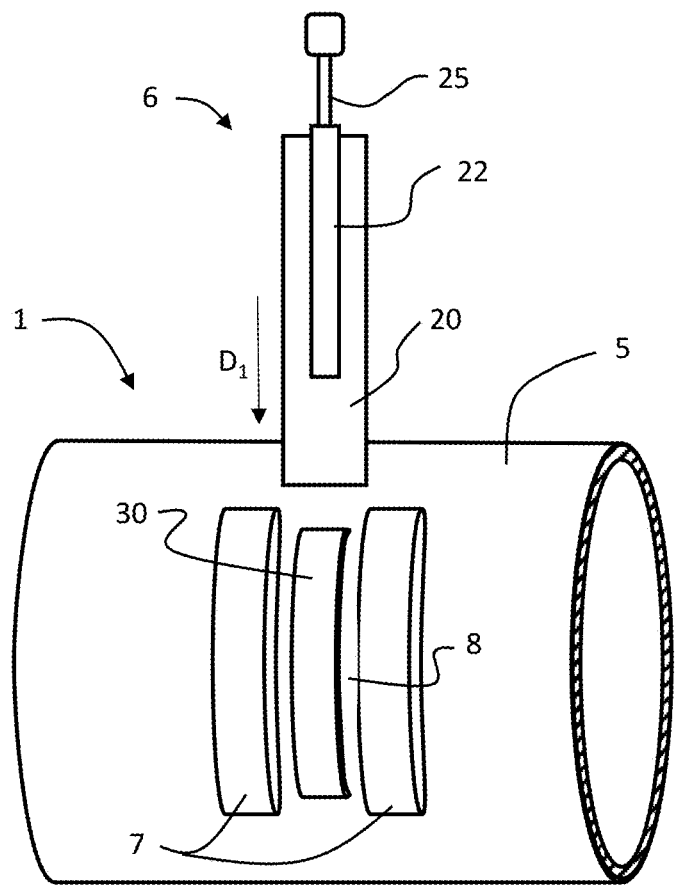
FIG. 7 is a side elevational view illustrating an assembly of a conduit having printed retention features for locating fasteners, a pad of flexible material and a mounting clip, the mounting clip located before assembly on the conduit in accordance to another embodiment of the present disclosure.

As is illustrated in FIG. 7, the pad 30 can also be printed between ribs 7 in recess 8. Upon installing clip 6 in recess 8 between ribs 7, as was explained earlier in FIG. 1, the resilient pad 20 provides a friction fit with arm 20 of the clip 6. In this manner, the clip 6 is retained in position transversally keeping the clip 6 from rotating about the conduit and simultaneously, ribs 7 prevent the clip 6 from being displaced from its installed position longitudinally along the pipe.

The structures described above printed on the conduit/pipe provide for easily manufactured retention features that could be fitted onto a conduit/pipe to prevent support clips from being displaced in handling and/or transportation.

The description in the present application should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "vessel," or "system," within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A vehicular conduit retention assembly, comprising:
   a conduit having an outer perimeter surface configured with the addition of one or more protrusions deposited on the outer perimeter surface of the conduit;
   an adhesion promotion layer applied on the conduit outer perimeter surface before depositing the one or more protrusions; and
   a mounting clip mounted to the conduit adjacent to one of the protrusions, the mounting clip including retention devices for attaching the conduit to a vehicular structure.

2. The vehicular conduit retention assembly of claim 1, wherein the protrusions are deposited by printing the protrusions in the shape of arcuate ribs somewhat larger than the outside diameter of the conduit.

3. The vehicular conduit retention assembly of claim 2, wherein the ribs are two in number and are printed onto the outer perimeter surface of the conduit diagonally opposite each other forming a recess therebetween, wherein the mounting clip is mounted in the recess.

4. The vehicular conduit retention assembly claim 1, wherein the conduit is a pipe and made from a stiff and rigid resin material.

5. The vehicular conduit retention assembly claim 1, wherein the conduit is a pipe formed from a flexible elastomeric resin material.

6. The vehicular conduit retention assembly of claim 2, wherein the one or more protrusions are printed on the conduit outer perimeter surface using at least one of:
   a flexographic printing process;
   a gravure printing process;
   a screen printing process; or a digital printing process.

7. The vehicular conduit retention assembly of claim 3, wherein
   the conduit outer perimeter surface includes a pad of flexible material printed on the conduit outer perimeter surface;
   a mounting clip mounted on the pad of flexible material the mounting clip including retention devices for attaching the conduit to the vehicular structure.

8. The vehicular conduit retention assembly of claim 3, wherein a pad of abrasive material is printed in the recess.

9. The vehicular conduit retention assembly of claim 3, wherein a pad of flexible material is printed in the recess.

10. A method for retaining a conduit to a vehicle, the method comprising:
    applying an adhesion promotion layer on a conduit outer perimeter surface;
    depositing one or more protrusions to the conduit outer perimeter surface on the adhesion promotion layer;
    mounting a clip to the conduit adjacent to one of the protrusions, and
    attaching the clip to a structure on the vehicle.

11. The method of claim 10, wherein the protrusions are deposited by printing the protrusions on the outer perimeter surface of the conduit in the shape of arcuate ribs somewhat larger than the outside diameter of the conduit.

12. The method of claim 11, wherein the ribs are two in number and are printed onto the outer perimeter surface of the conduit diagonally opposite each other forming a recess therebetween, whereby the mounting clip is mounted in the recess.

13. The method of claim 10, wherein the mounting clip includes retention devices for attaching the conduit to the vehicle structure.

14. The method of claim 11, wherein the one or more protrusions are printed on the conduit outer perimeter surface using at least one of:
    a flexographic printing process;
    a gravure printing process;
    a screen printing process; or
    a digital printing process.

15. The method of claim 11, wherein
    a pad of flexible material is printed on the conduit outer perimeter surface; and
    mounting a clip on the pad of flexible material, the mounting clip including retention devices for attaching the conduit to the vehicular structure.

16. The method of claim 12, wherein a pad of flexible material is printed in the recess.

17. The method of claim 12, wherein a pad of abrasive material is printed in the recess.

18. The method of claim 12, wherein a pad of adhesive material is printed in the recess.

* * * * *